Patented Apr. 9, 1946

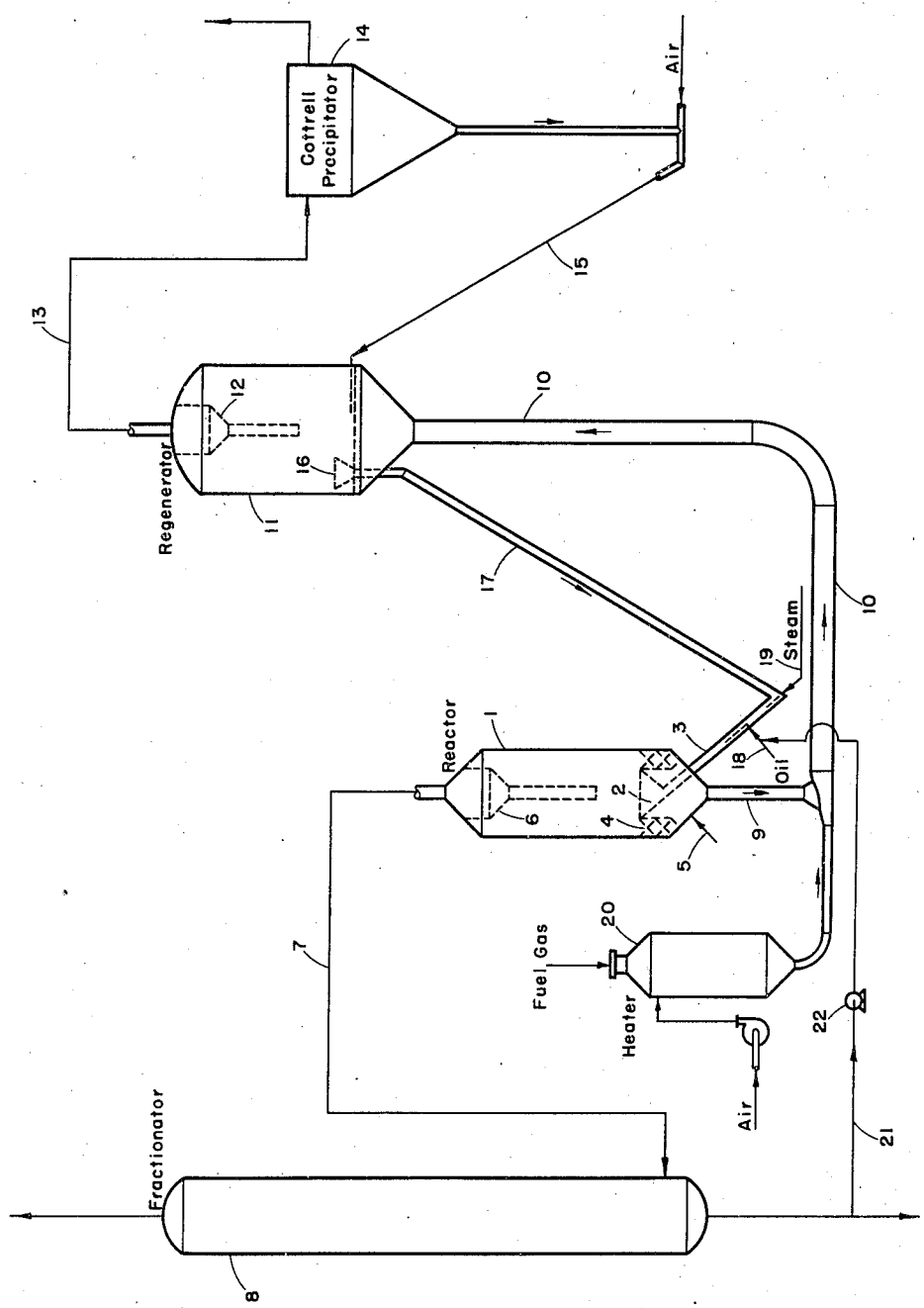

2,398,228

UNITED STATES PATENT OFFICE 2,398,228

STARTING PROCEDURE FOR CRACKING UNITS

Ernest W. Hunt, Baytown, Tex., assignor to Standard Oil Development Company, a corporation of Delaware Application June 27, 1944, Serial No. 542,276

2 Claims. (Cl. 196—52)

The present invention is directed to catalytic cracking of the type in which a so-called fluid flow of catalyst is employed and particularly to that type of fluid flow operation known as downflow operation.

In the downflow type of fluid flow catalytic cracking the oil to be cracked is introduced in liquid or vapor form in admixture with superheated steam or gas and finely divided catalyst into the bottom of the reactor. The velocity of flow of the reactants is so adjusted as to carry the catalyst to a certain point in the reactor at which point there is a concentration of catalyst particles forming what may be referred to as a dense zone from the outer annulus of which catalyst continuously falls by gravity to the bottom of the reactor. In falling to the bottom of the reactor it passes through a steam stripping zone where it is stripped of absorbed hydrocarbon vapors and thence is conducted out of the bottom of the reactor to a regenerator from which it is continuously reintroduced into the reactant feed line. The bulk of the heat required for the cracking operation is supplied by the heat carried by the catalyst as a result of the regeneration step, the latter consisting of a burning operation in which carbon is burned off the catalyst leaving the catalyst in a very hot condition. When this process is in operation, very little, if any, supplemental heat need be added to the reactants in the form of superheated steam or in any other form. It is to this type of operation that reference will be made hereinafter by the expression "a fluid flow catalytic cracking operation of the down flow type."

In starting up such a unit, there is a problem encountered in bringing the reactor to reaction temperature. What is actually involved is the raising of the temperature of the catalyst throughout its entire cycle substantially to reaction temperature. In the past this has been accomplished by circulating hot gas through the catalyst cycle by introducing it into the regenerator, as well as into the catalyst inlet to the reactor. The hot gas entering the regenerator carries the catalyst particles into the regenerator to an intermediate point therein where a dense zone is established from which hot catalyst drops into a stand pipe leading to the reactor. At the lower end of the stand pipe, the catalyst is moved on by a further injection of air into the reactor where again a dense zone is formed in an intermediate portion with catalyst dropping out to the bottom of the reactor and thence to the return line to the regenerator. This circulation of catalyst with hot gas at a sufficiently high temperature was continued until the catalyst cycle was at a temperature of about 600° to 650° F. Then it was customary to inject some of the feed oil into the lower part of the regenerator so that by the combustion thereof a sufficient amount of heat could be developed to bring the catalyst up to reaction temperature or about 900–1050° F.

The hot gas ordinarily used in this starting up procedure is a gas resulting from the combustion of hydrocarbon gas with an excess of air. This excess of air passes into the regenerator and on through the cyclone separator through a subsequent Cottrell precipitator and other equipment. When the oil is sent into the regenerator to provide an additional source of heat, some hydrocarbon vapors, together with carbon monoxide formed in the combustion and excess air, pass into the equipment beyond the cyclone separator where "after-burning" occurs. The occurrence and the extent of this "after-burning" is not very easy to control with the result that a safety hazard is created and much damage to equipment is incurred.

According to the present invention the starting-up operation is conducted in a more advantageous manner by conducting it by the previous method up to the point of the introduction of oil into the system. According to the present invention this oil is introduced into the feed line to the reactor rather than into the regenerator. The result of this is that most of the vaporizable constituents in the oil are distilled over into the fractionating equipment associated with the reactor leaving on the catalyst only asphaltic or coky materials, which are then conveyed back to the regenerator to supply the carbonaceous material for bringing the temperature of the catalyst cycle up to reaction temperature. As a consequence, the "after-burning" in the equipment following the regenerator is eliminated, with a consequent saving and in safety increase.

An additional advantage of this procedure is that by reason of the introduction of hydrocarbon vapors into the fractionating equipment, this equipment is also gradually brought up to onstream operation so that when the reaction starts a great deal of trouble previously encountered in regulating the fractionating equipment at the beginning of the operation is eliminated.

The present invention may be more clearly understood from the following detailed description of the accompanying drawing in which the single figure is a front elevation in diagrammatic form of one type of apparatus suitable for the practice of the present invention.

Referring to the drawing in detail, numeral 1 designates a catalytic reactor which has located in its lower central portion a feed funnel 2 for reactants and catalyst connected to a pipe 3 extending outside the vessel. Around the funnel 2 is arranged a disc and donut arrangement 4 through which the descending catalyst passes against an incoming stream of stripping medium such as steam introduced at the bottom of the reactor through one or more nozzles 5. The upper part of the reactor is provided with a cyclone separator 6 and a vapor outlet line 7 which conducts the vaporous reaction product to a fractionator 8.

The used catalyst leaves the bottom of the reactor through discharge line 9, which empties into a catalyst line 10 connected to the bottom of a regenerator 11. This regenerator is also provided at its upper end with a cyclone separator 12 and with a vapor outlet line 13 which carries vapors or gases to a Cottrell precipitator 14 from which the gases or vapors pass to other equipment not shown. The solids separated in the precipitator are sent back to the regenerator by line 15.

In the lower portion of the regenerator is an open funnel 16, carried by a pipe 17 which passes through the wall of the regenerator and connects with catalyst feed pipe 3. The used catalyst is carried into the regenerator with a stream of air or other regenerating gas traveling at a sufficient velocity to carry the catalyst to a point intermediate the ends of the regenerator above the funnel 16. At this point there is created what is referred to as a dense zone from which catalyst continuously drops out, this catalyst in dropping being received by the funnel 16 and conducted back to catalyst feed line 13. The latter is supplied with hydrocarbon feed line 18 and steam feed line 19.

The catalyst line 10 is connected to a furnace 20 in which is burned a mixture of combustible gas and air with a large excess of air. During the operation of the system, this furnace serves to heat up the regenerating air so that it will be at a temperature sufficient readily to burn off the carbonaceous material from the catalyst. During the starting-up process, this same hot gas containing an excess of air is used to heat up the catalyst cycle to a temperature, as aforesaid, between about 600° and 650° F.

In starting up this system, according to the present invention, the hot air flow through line 10 is initiated and at the same time steam is introduced through line 19 to start movement of the catalyst in the reactor. As a result of the action of the two gas streams, the catalyst begins to move in the cycle from the regenerator to the reactor and back to the regenerator. When this movement has continued long enough to bring the temperature of the catalyst up to about 600° to 650° F. oil is sent in through line 18 in an amount sufficient to provide a coating of carbonaceous material on the catalyst particles but in an amount constituting only a fraction of onstream quantity. As the catalyst particles so coated are recycled to the regenerator, the carbonaceous material contained on them is burned by the hot air providing additional heat. This procedure is continued until the catalyst temperature has reached reaction temperature, or slightly above reaction temperature. Then the flow of oil through pipe 18 is increased to onstream quantity and the catalytic cracking operation is onstream.

When oil is first introduced into line 18 during the starting-up operation, it is convenient to employ an oil similar to the normal feed to the cracking operation. However, as the lighter fractions of this oil pass from reactor 1 through line 7 into fractionator 8, they carry small quantities of catalyst. As fractionator 8 is gradually brought up to temperature, the lightest fractions can be caused to gradually distill out of tower 8 leaving the accumulation of catalyst particles in suspension in oil in the bottom of the tower. In the practice of the present invention, this slurry may be used to supplement feed oil by withdrawing the slurry from the bottom of tower 8 through line 21 by means of pump 22. By employing this slurry oil as a source of heat in accordance with the present invention, accumulations of catalyst in tower 8 can be conveniently returned to the reaction zone 1.

The nature and objects of the present invention having been fully described, what I wish to claim as new and useful and to secure by Letters Patent is:

1. In the starting up of a fluid flow catalytic cracking operation of the down-flow type in which catalyst is continuously withdrawn from the bottom of a reactor and fed to a regenerator from which it is fed back to the reactor, the steps of setting the catalyst into motion through its cycle with a hot gas, maintaining movement of the catalyst with the hot gas until the temperature in the catalyst cycle is substantially increased but below cracking temperature, injecting an amount constituting a fraction of onstream quantity of oil having heavy constituents and lighter constituents into the catalyst fed to the reactor to thereby cause vaporization of the lighter constituents of the oil and deposit heavy constituents on the catalyst, feeding the catalyst carrying said constituents to the regenerator, burning said constituents in the regenerator to thereby additionally increase the temperature of the catalyst, continuing this procedure until the temperature in the catalyst cycle is the desired cracking temperature and then feeding the oil to be cracked to the reactor in full onstream quantity.

2. In the starting up of a fluid flow catalytic cracking operation of the down-flow type in which catalyst is continuously withdrawn from the bottom of a reactor and fed to a regenerator from which it is fed back to the reactor, the steps of setting the catalyst into motion through its cycle with a hot gas, maintaining movement of the catalyst with the hot gas until the temperature in the catalyst cycle is between about 600° and 650° F., injecting an amount constituting a fraction of onstream quantity of oil having heavy constituents and lighter constituents into the catalyst fed to the reactor to thereby cause vaporization of the lighter constituents of the oil and deposit heavy constituents on the catalyst, feeding the catalyst carrying said constituents to the regenerator, burning said constituents in the regenerator to thereby additionally increase the temperature of the catalyst, continuing this procedure until the temperature in the catalyst cycle is between about 900° and 1050° F. and then feeding the oil to be cracked to the reactor in full onstream quantity.

ERNEST W. HUNT.